(12) United States Patent
Kobayashi et al.

(10) Patent No.: US 7,445,489 B2
(45) Date of Patent: Nov. 4, 2008

(54) LOCKING CONSTRUCTION AND A CONNECTOR PROVIDED THEREWITH

(75) Inventors: Tomohiko Kobayashi, Yokkaichi (JP); Takao Hata, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 11/942,805

(22) Filed: Nov. 20, 2007

(65) Prior Publication Data

US 2008/0121426 A1    May 29, 2008

(30) Foreign Application Priority Data

Nov. 24, 2006   (JP) .............................. 2006-317610

(51) Int. Cl.
*H01R 13/58*   (2006.01)
(52) U.S. Cl. ...................... 439/456; 174/135
(58) Field of Classification Search ................ 439/456, 439/471, 473, 445; 174/135; 220/326
See application file for complete search history.

(56) References Cited

U.S. PATENT DOCUMENTS

| 3,336,567 A | * | 8/1967 | Coldren ...................... 439/685 |
| 4,921,454 A | * | 5/1990 | Atherton et al. .............. 439/685 |
| 5,675,128 A | | 10/1997 | Simon |
| 6,478,607 B2 | | 11/2002 | Tabata |
| 2005/0029005 A1 | | 2/2005 | Arai et al. |

FOREIGN PATENT DOCUMENTS

| FR | 2 300 290 A | 0/1976 |
| JP | 06 245348 | 0/1994 |
| JP | 8-9532 | 0/1996 |

* cited by examiner

*Primary Examiner*—Phuong K Dinh
(74) *Attorney, Agent, or Firm*—Gerald E. Hespos; Anthony J. Casella (57) ABSTRACT

An insertion area for an unlocking jig (D) differs depending on whether unlocking is effected using a first fulcrum portion (22) as a fulcrum or using a second fulcrum portion (27) as a fulcrum. Since this enables an unlocking operation to be carried out by inserting the unlocking jig (D) into the selected one of the different insertion areas, restriction on the insertion area for the unlocking jig (D) can be alleviated and consequently restriction in terms of the arrangement of parts can be alleviated as compared to the case where the insertion area is limited to one spot.

15 Claims, 8 Drawing Sheets

LOCKING CONSTRUCTION AND A CONNECTOR PROVIDED THEREWITH

BACKGROUND OF THE INVENTION

1. Field of the Invention

The invention relates to a locking construction with a resiliently deformable lock piece and to a connector provided therewith.

2. Description of the Related Art

Japanese Unexamined Patent Publication No. H08-9532 discloses a lock construction for locking a cover on a box main body of a relay box. Lock projections are provided on the outer wall of the cover and lock pieces cantilever up from the outer wall of the box main body towards the cover. The lock pieces are formed with lock holes engageable with the lock projections of the cover.

Upper ends of the lock pieces move onto the lock projections and deform outward when the cover is mounted on the box main body. The lock pieces are restored resiliently inward when the upper ends of the lock pieces move over the lock projections, and the lock holes of the lock pieces engage the lock projections to lock the box main body and the cover together.

The cover may have to be detached from the box main body for maintenance or the like. Accordingly, the leading end of a jig, such a minus driver, is inserted at the inner side of the upper end of the lock piece from above the cover to deform the lock piece in an unlocking direction. A lever action generally is utilized to perform the unlocking operation with a small force. Hence, the leading end of the jig is placed on the leading end of the lock piece and an intermediate part of the jig is brought into contact with the outer edge of the cover while. The jig then is inclined about the fulcrum where the contact part is supported on the cover. In this manner, the leading end of the jig can displace the lock piece in the unlocking direction.

An angle of the jig during unlocking is determined by the position of the leading end of the lock piece and the position of the fulcrum obtained when the intermediate part of the jig contacts the cover. However, the supporting point is at only one point determined by the shape of the cover. This means that an insertion area of the jig for the unlocking operation is restricted to a very narrow angle range only at one point, which consequently leads to restriction in the arrangement of parts since other parts cannot be arranged in a planned area where the jig is to be inserted for the unlocking operation.

For example, in the case of assembling electric components such as switches and connectors into a vehicle door, a high-density arrangement is forced due to insufficient space around these electric components. In such a case, the conventional locking construction cannot be adopted for the electric components due to the restriction in terms of the arrangement of parts.

The invention was developed in view of the above, and an object thereof is to provide a locking construction including a resiliently deformable lock piece and capable of alleviating restriction on a jig insertion area necessary for an unlocking operation and facilitating the arrangement of parts.\

SUMMARY OF THE INVENTION

The invention relates to a locking construction for locking a first member and a second member in an attached state. The locking construction includes at lest one resiliently deformable lock piece cantilevered on the first member. The cantilevered lock piece has a free front end that deforms while attaching the first and second members together. However, the lock piece resiliently restores to engage a lock on the second member when the two members reach a properly attached state. At least one unlocking portion is provided on the lock piece for engagement by a leading end of an unlocking jig. A first fulcrum is provided on the first member at a position closer to the base end of the lock piece closer than the unlocking portion. The first fulcrum can support a part of the unlocking jig while the leading end of the unlocking jig is engaged with the unlocking portion. The first fulcrum thus supports a lever action so that the leading end of the unlocking jig can deform the lock piece in an unlocking direction. A second fulcrum is provided at a position different from the first fulcrum and can support a part of the unlocking jig while the leading end of the unlocking jig is engaged with the unlocking portion. Thus, the second fulcrum supports a lever action so that the leading end of the unlocking jig can deform the lock piece in the unlocking direction.

The lock piece can be deformed in the unlocking direction to disengage the lock and the lock piece. More particularly, the unlocking jig can be inserted near the first fulcrum so that the leading end of the unlocking jig engages the unlocking portion. A lever action then is generated while the part of the unlocking jig closer to the base end than the leading end is placed on the first fulcrum. The lock piece similarly can be deformed in the unlocking direction by inserting the unlocking jig near the second fulcrum, which is at a position different from the first fulcrum. The leading end of the unlocking jig is engaged with the unlocking portion and the part of the unlocking jig closer to the base end than the leading end is placed on the second fulcrum. An insertion area for the unlocking jig differs depending on whether unlocking is effected using the first or second fulcrum. Thus, unlocking can be effected by inserting the unlocking jig into the selected insertion areas and a restriction on the insertion area for the unlocking jig is alleviated as compared to the case where there is only one insertion area. A degree of freedom in designing for the arrangement of parts is improved and restriction in terms of the arrangement of parts is alleviated because it is sufficient to ensure either one of the two different insertion areas is available for the unlocking operation.

The second member preferably includes two facing lock walls each of which has a lock portion and substantially facing each other.

Two lock pieces preferably are provided for engagement with the lock walls from the corresponding outer sides.

The lock pieces preferably are provided integrally or unitarily with auxiliary walls that are insertable at the inner sides of the lock walls and for sandwiching the lock walls in cooperation with the lock pieces. The auxiliary walls preferably are integral to the lock pieces. Thus, the lock pieces become less likely to be displaced out in the unlocking direction. Accordingly, the lock pieces and the locks are less likely to disengage from each other, and the members are held reliably in the attached state.

The unlocking portion preferably is exposed at the free end of the lock piece. Accordingly, the unlocking jig can be inserted from the free end of the lock piece to disengage the lock piece and the lock. The unlocking operation can be carried out from the base end of the lock piece and from the free end thereof. Thus, restrictions on the insertion area for the unlocking jig necessary for the unlocking operation are alleviated and there are fewer restrictions on the arrangement of parts.

The lock piece preferably has two standing portions standing up from the projecting ends of at least one connecting portion and an engaging portion connects the upper ends of the standing portions.

A first inclined guiding surface may be formed at the inner side of one part of the unlocking portion and extends along an inserting direction of the unlocking jig. A second inclined guiding surface may be formed at the outer side of one portion of each auxiliary wall and at the second fulcrum and extends along an inserting direction of the unlocking jig.

The invention also relates to a connector having a wire holder mountable thereto by means of the above-described locking construction. A guiding portion of the wire holder for holding the one or more bent wires to extend in a specified direction is the first member and a fixable portion of a connector housing of the connector is the second member.

These and other features of the invention will become more apparent upon reading of the following detailed description of preferred embodiments and accompanying drawings.

DETAILED DESCRIPTION OF THE PREFERRED EMBODIMENTS

A wire holder in accordance with the invention is identified by the numeral 10 in FIGS. 1 to 4. The wire holder 10 is mountable on a connector 40 that is connectable with a device-side connector (not shown). The connector 40 includes a housing 41 made e.g. of a synthetic resin and substantially in the form of a rectangular parallelepiped. Unillustrated terminal fittings are accommodated in the housing 41 and wires W are connected with the respective terminal fittings. The wires W extend down in a draw-out direction from a draw-out surface at the bottom of the housing 41. The drawn-out wires W then are bent substantially forward (to the left in FIG. 1) by the wire holder 10. Locking projections 42 are formed on the housing 40 and are spaced apart in the width direction. The locking projections 42 are used to mount the wire holder 10.

The wire holder 10 is made e.g. of a synthetic resin and is mounted to extend along the rear or restoring side RS of the bent wires W projecting out from the housing 41. The wire holder 10 has a substantially vertically long shape before the wires W are bent (see FIGS. 2 and 3).

Two mounting portions 11 are provided at the upper end of the wire holder 10 and are spaced apart sufficiently in the width direction for aligning with the locking projections 42. Each mounting portion 11 is formed with a locking hole 11A that is engageable with the corresponding locking projection 42 of the connector 40. Thus, the wire holder 10 is be mounted on the connector 40 by engaging the corresponding locking holes 11A and locking projections 42.

Figure 2:
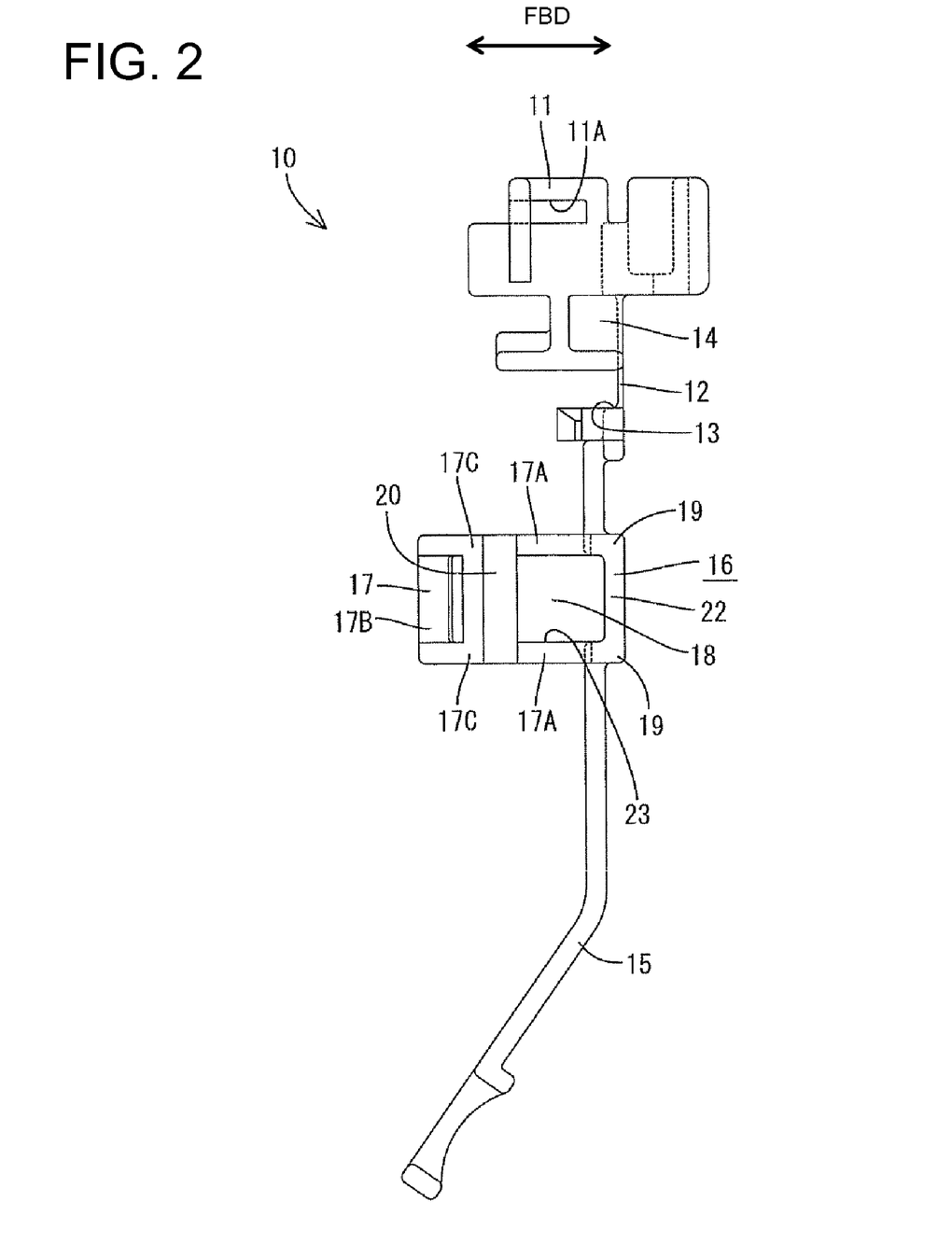
FIG. 2 is a side view of the wire holder.
Figure 3:
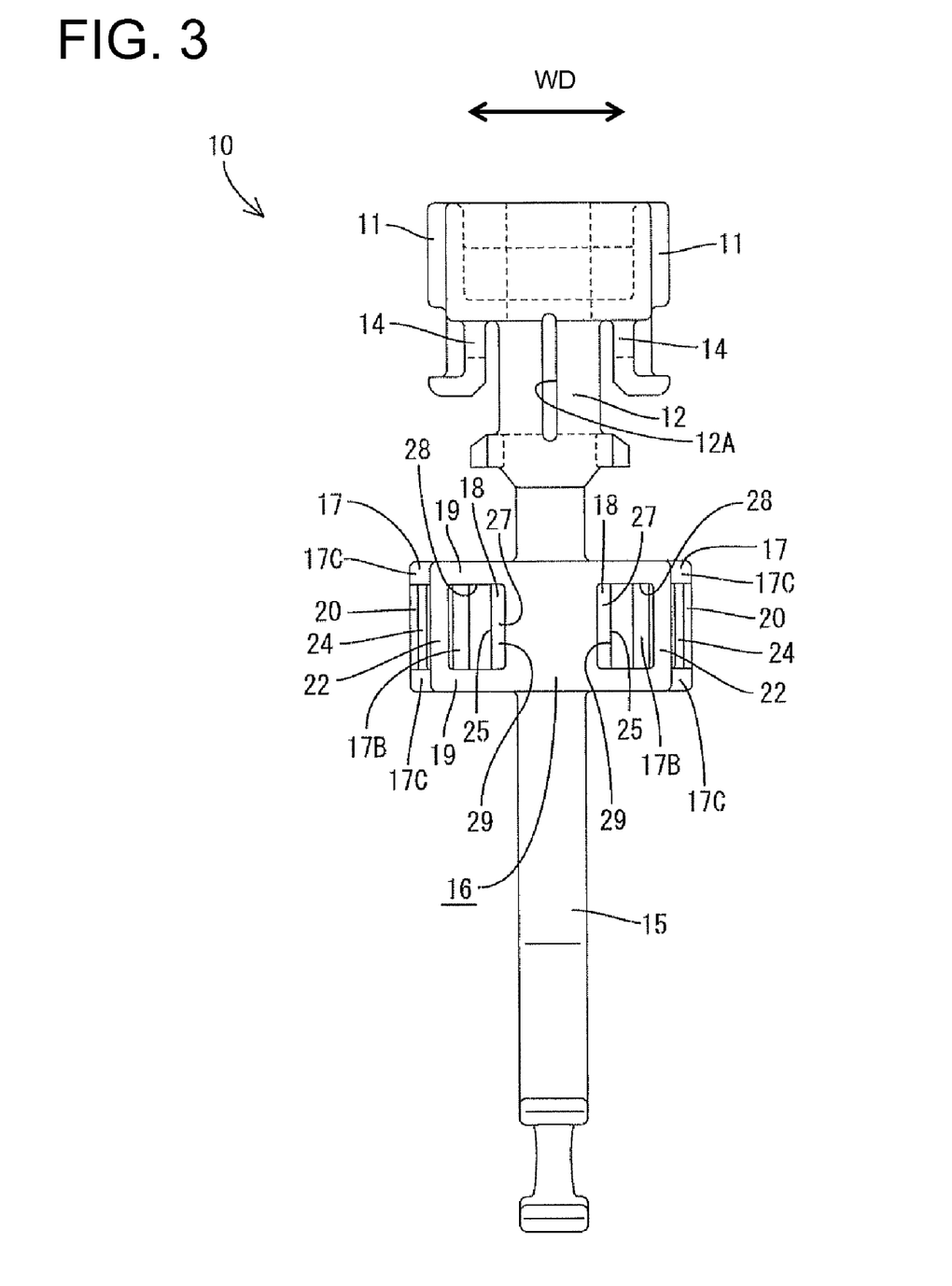
FIG. 3 is a rear view of the wire holder.

A bendable portion 12 is provided below the mounting portions 11 and is bendable in forward and backward directions FBD (transverse direction in FIG. 2). As shown in FIG. 3, the bendable portion 12 is a thin substantially rectangular plate elongated substantially in the vertical direction. A long hole 12A is formed at a widthwise intermediate position of the bendable portion 12 and extends substantially vertically to increase flexibility of the bendable portion 12. The bendable portion 12 is retracted back from parts above and below it, and an escaping portion 13 is recessed backward in the front side of the bendable portion 12 as shown in FIG. 2. The wires W arranged before the bendable portion 12 are bent forward as the bendable portion 12 is bent, and the bent parts of the wires W enter the escaping portion 13. Accordingly, the wires W are attached closely to the wire holder 10 to suppress shaking of the wires W at positions near the housing 41 and to prevent adverse effects on the terminal fittings due to shaking of the wires W.

Two protection walls 14 are provided at the opposite sides of the bendable portion 12 and are spaced apart in the width direction WD. Opposed inner surfaces of the protection walls 14 cover and protect the bent parts of the wires W.

A long narrow plate-shaped guide 15 extends down from the bendable portion 12 for holding the bent wires W to extend forward.

A fixing portion 16 is provided near the upper end of the guide 15 near the bendable portion 12 for locking the guide 15 in an attached state to a fixable portion 50. The fixing portion 16 is fixed to a fixable portion 50 while the bendable portion 12 is bent to hold the wires W in a bent state.

The fixable portion 50 includes two lock walls 51 arranged to face each other (see FIGS. 4 to 8). The lock walls 51 are vertically long and lock projections 52 project out from the outer surfaces of the lock walls 51. Lock surfaces 52A are defined at the upper ends of the lock projections 52 and extend substantially normal to the outer surfaces of the lock walls 51. Inclined bearing surfaces 52B are formed at lower parts of the lock projections 52 and project at greater distances from the outer surfaces of the lock walls 51 at positions closer to the lock surface 52A.

The fixing portion 16 of the guide 15 includes two lock pieces 17 that engage the lock walls 51 from the outer sides. The fixing portion 16 also has two auxiliary walls 18 that be inserted at the inner sides of the lock walls 51. Thus, the lock pieces 17 and the auxiliary walls 18 can cooperate to sandwich the corresponding lock walls 51.

Figure 4:
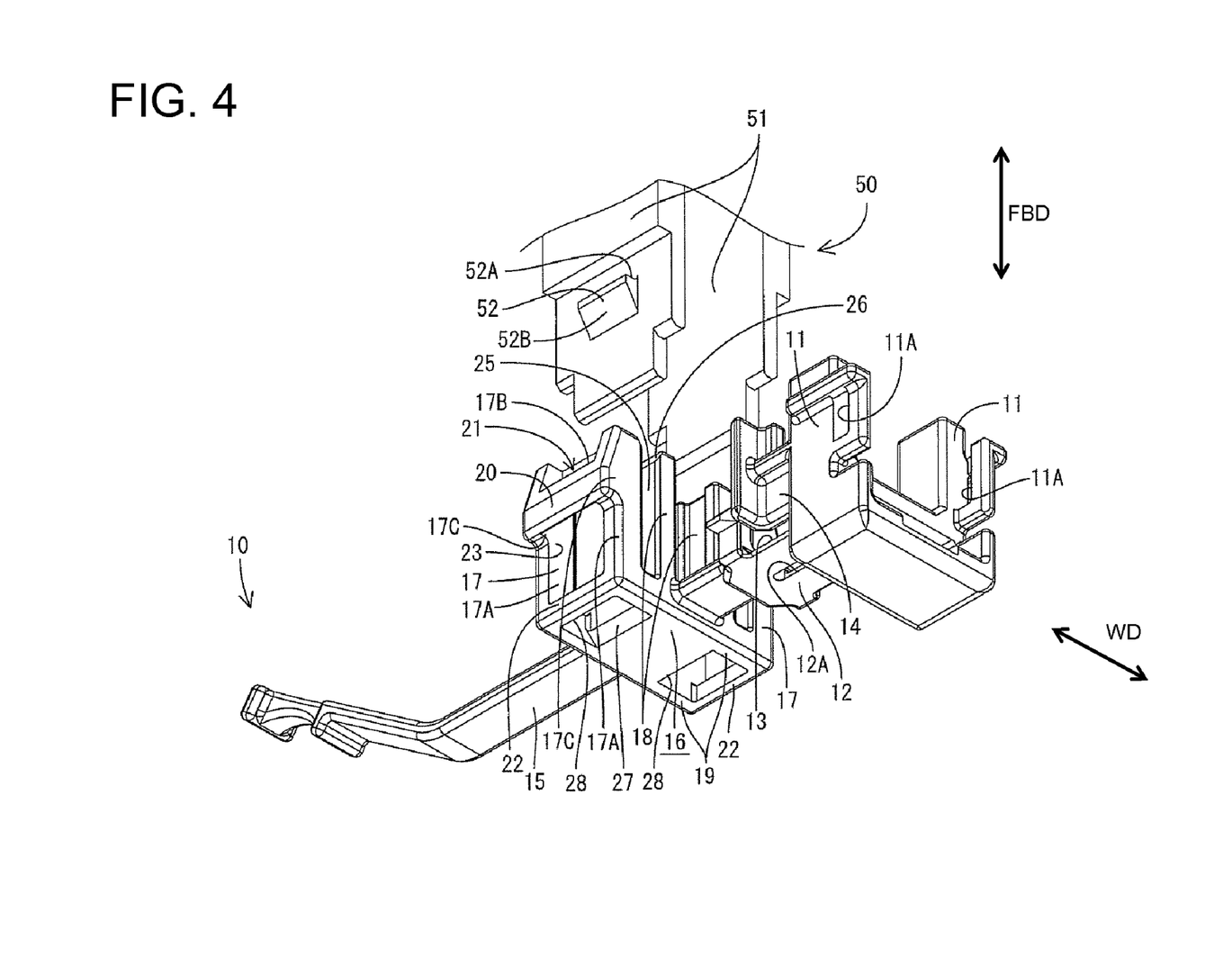
FIG. 4 is a perspective view showing the external appearances of the wire holder and a fixable portion.

As shown in FIGS. 3 and 4, the lock pieces 17 and the auxiliary walls 18 are joined unitarily to each other by connecting portions 19 projecting to the opposite sides in width direction WD from the guide 15. The connecting portions 19 are spaced apart by a specified distance that exceeds the width of the lock projections 52 in forward and backward directions FBD (extending direction of the guide 15).

The lock pieces 17 are cantilevered to stand back-to-back at opposite ends of the connecting portion 19 with respect to the projecting direction, and have free upper ends. The lock pieces 17 deform out in opening directions upon attaching the guide 15 to the fixable portion 50, but are restored resiliently inward in closing directions to engage the lock projections 52 of the fixable portion 50 when the guide 15 and the fixable portion 50 reach a proper attached state.

Figure 1:
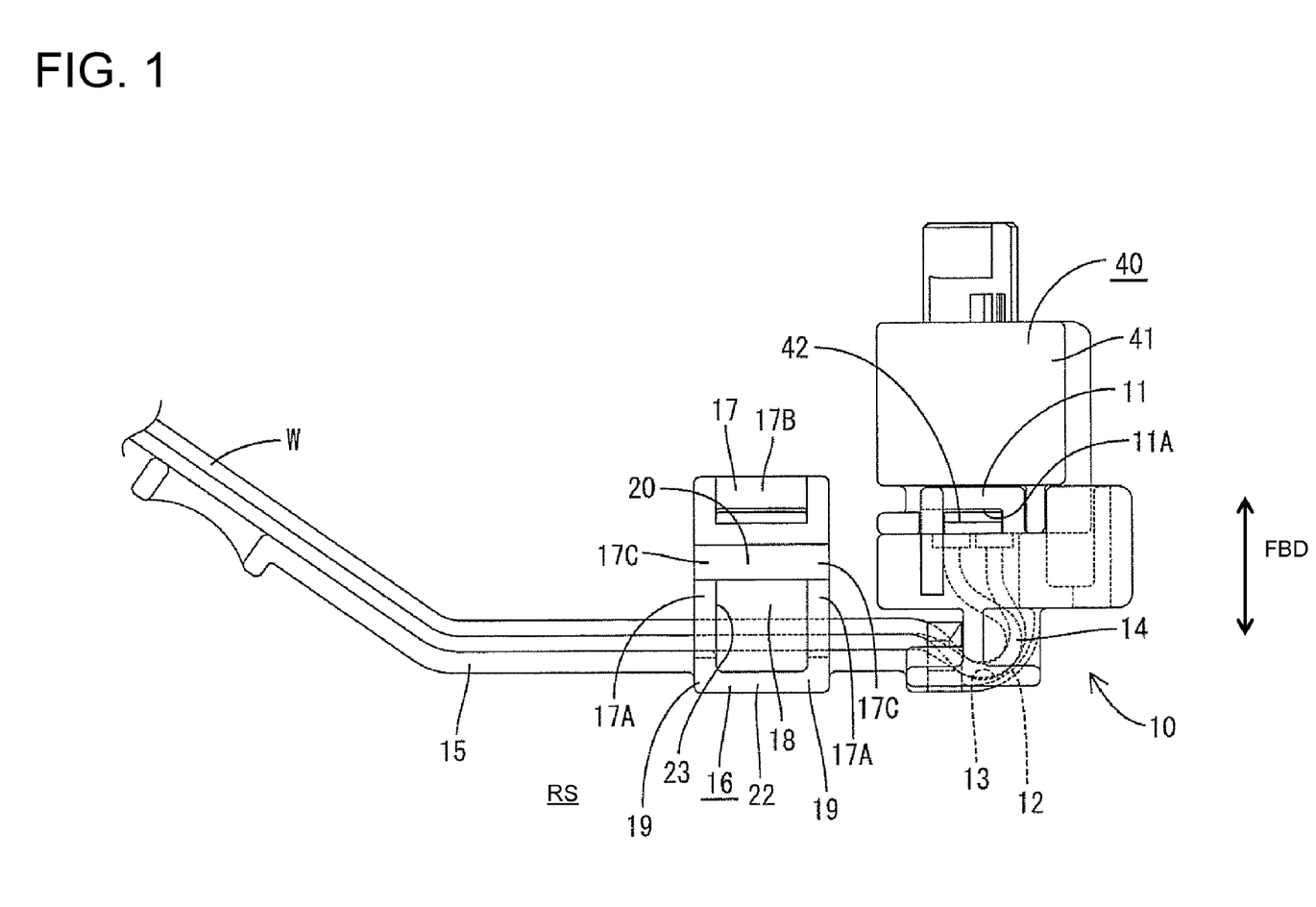
FIG. 1 is a side view showing a mounted wire holder.

As shown in FIGS. 1 and 2, each lock piece 17 has two standing portions 17A standing up from the projecting ends of the corresponding connecting portion 19 and an engaging portion 17B connects the upper ends of the standing portions 17A. The standing portions 17A are substantially in the form of cantilevers that have base ends joined to the connecting portion 19 and free upper ends. The standing portions 17A in each pair are spaced apart by a distance that exceeds the width of the lock projection 52.

As shown in FIG. 4, each standing portion 17A is formed such that a dimension in inward and outward directions along the projecting directions of the connecting portion 19 is slightly larger than a dimension in forward and backward directions (facing directions of the standing portions 17A). Thus, rigidity in inward and outward directions is greater than in forward and backward directions FBD. Further, a projection 17C is formed at an upper part of each standing portion 17A and juts more outward than a lower part.

Figure 5:
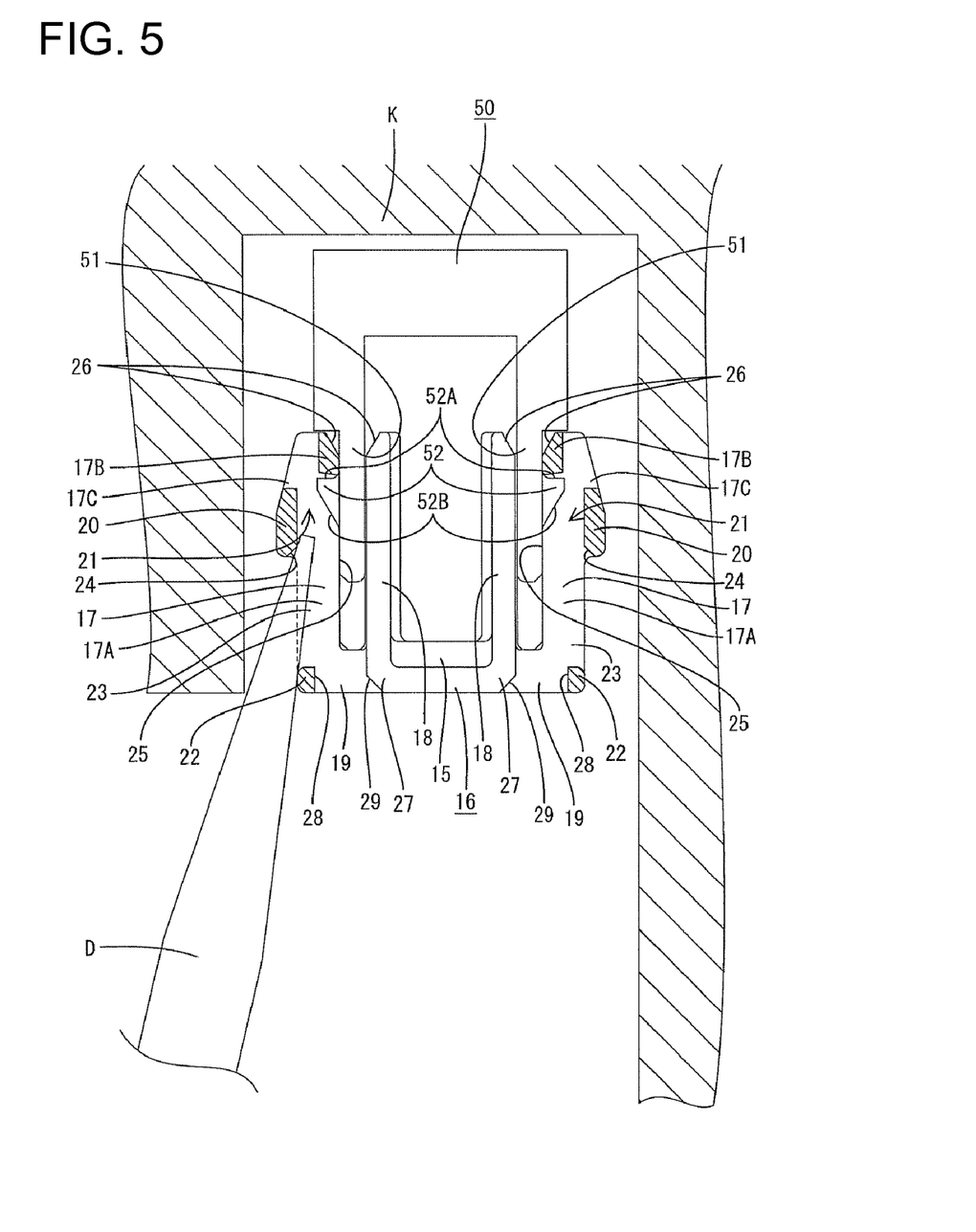
FIG. 5 is a partial enlarged section showing a state where a jig is inserted through a first opening of a left lock piece.

As shown in FIG. 5, the engaging portions 17B connect the upper ends of the standing portions 17A in each pair, and are located at the innermost positions of the upper ends of the standing portions 17A. The engaging portions 17B are engageable with the lock surfaces 52A of the lock projections 52 from above. Forces acting on the engaging portion 17B are received by both standing portions 17A due to the connection of the opposite ends of the engaging portion 17B with the standing portions 17A. Thus, the engaging portions 17B can strongly engage the lock surfaces 52A of the lock projections 52. Further, the extension of the standing portions 17A can be suppressed to a minimum level by providing the engaging portion 17B at the upper ends of the standing portions 17A.

An unlocking plate 20 is provided above the middle of the standing portions 17A and connects the projecting edges of the projections 17 at the outer side edges of the lock pieces 17 in each pair. The inner surface of the unlocking plate 20 is aligned in inward and outward directions with the outer edges of the lower parts of the standing portions 17A below the projections 17C. The unlocking plate 20 is used with an unlocking jig D that has a shaft and a flat surface at the leading end of the shaft. More particularly, the flat surface at the leading end of the unlocking jig D is placed on the inner surface of the unlocking plate 20. The unlocking jig D then is manipulated to displace the lock piece 17 out in the unlocking direction.

A vertically open passage 21 is defined between the unlocking plate 20 and the engaging portion 17B. The leading end of the unlocking jig D can be inserted through the passage 21 from below or from above the lock piece 17 to push the unlocking plate 20.

A first fulcrum 22 is provided near the bottom ends of the standing portions 17A of lock piece 17 and can support the unlocking jig D when the leading end of the unlocking jig D has been placed on the inner surface of the unlocking plate 20. The first fulcrum 22 connects the bottom ends of the standing portions 17A and the projecting ends of the connecting portion 19. Additionally, the first fulcrum 22 is displaced in from the unlocking portion 20, which is at the outermost ends of the standing portions 17A (leading edges of the projections 17C). More particularly, the inner surface of the unlocking portion 20 and the outer surface of the first fulcrum portion 22 substantially align in inward and outward directions.

A first opening 23 is defined between the first fulcrum 22 and the unlocking plate 20. The first opening 23 is surrounded by the unlocking plate 20, the first fulcrum 22 and both standing portions 17A. The unlocking jig D can be inserted into the first opening 23 from an outer lower side to bring the leading end of the unlocking jig D into contact with the inner surface of the unlocking plate 20 and to have a part of the unlocking jig D spaced from the leading end supported on the first fulcrum 22. A first inclined guiding surface 24 is formed at the inner side of the bottom end of the unlocking portion 20 and is inclined along an inserting direction of the unlocking jig D for guiding the leading end of the unlocking jig D from the outer side towards the inner side.

Two auxiliary walls 18 are provided between the lock pieces 17 and substantially at the opposite sides of the guide 15. The auxiliary walls 18 are vertically long rectangles and stand up from the connecting portion 19 so that the plate surfaces of the auxiliary walls 18 face each other. The width of each auxiliary wall 18 along the shorter sides (parallel to the guide 15) substantially equals the width of each lock piece 17, and the longitudinal dimension of each auxiliary wall 18 substantially equals the extension of the lock pieces 17.

The outer surface of each auxiliary wall 18 and the inner surfaces of the standing portions 17A of the corresponding lock piece 17 face each other and are spaced apart by a distance equal to the thickness of the lock wall 51 plus a specified clearance. Thus, an insertion space 25 is defined between each auxiliary wall 18 and the corresponding lock piece 17 for receiving one of the lock walls 51. Slanted surfaces 26 are formed at the upper ends of the respective insertion spaces 25 and are inclined to narrow the spacing between the inner sides of the upper ends of the respective auxiliary walls 18 and lock pieces 17 from the upper end towards the lower end.

Second fulcrums 27 are defined at the bottom ends of the respective auxiliary walls 18 and can support the unlocking jig D while the leading end of the unlocking jig D is placed on the inner surface of the unlocking plate 20. A second opening 28 is defined between the corresponding first fulcrum 22 and second fulcrum 27. As shown in FIGS. 3 and 4, the second opening 28 is surrounded by the second fulcrum 27, the two connecting portions 19 and the first fulcrum 22. The leading end of the unlocking jig D can be inserted from below, through the second opening 28 and into contact with the inner surface of the unlocking plate 20 while a part of the unlocking jig D spaced from the leading end thereof is supported on the second fulcrum 27. A second guiding surface 29 is formed at the second fulcrum 27 of each auxiliary wall 18 and is inclined from the lower side toward the upper side to guide the leading end of the unlocking jig D.

The wire holder 10 is mounted by placing the guide 15 along the rear sides of the wires W extending down in the draw-out direction from the connector 40. The locking holes 11A of the wire holder 10 then are engaged with the locking projections 42 of the housing 41 to mount the wire holder 10 on the connector 40.

Subsequently, as shown in FIG. 1, the bendable portion 12 of the wire holder 10 is bent to bend the wires W substantially at right angles and the fixing portion 16 is fixed to the fixable portion 50. The fixing portion 16 is brought closer to the fixable portion 50 as the bendable portion 12 is bent and the insertion spaces 25 are positioned with respect to the corresponding lock walls 51. The bottom ends of the respective lock walls then 51 are inserted into the upper ends of the insertion spaces 25. The slanted surfaces 26 at the upper ends of the insertion spaces 25 contact the bottom ends of the respective lock walls 51 to correct the orientation of the fixing portion 16. In this way, the insertion into the insertion spaces 25 is carried out smoothly.

The lock walls 51 are inserted more deeply into the corresponding insertion spaces 25 and the lock pieces 17 are deformed out to widen the spacing therebetween as the engaging portions 17B thereof move onto the bearing surfaces 52B. The lock pieces 17 are restored resiliently when the engaging portions 17B move over the lock projections 52 and the engaging portions 17B engage the lock projections 52 from above to lock the fixing portion 16 with the fixable portion 50. At this time, the bottom ends of the lock walls 51 contact the upper sides of the connecting portions 19 of the fixing portion 16 to prevent an upward displacement of the fixing portion 16 relative to the lock walls 51 to the locked state reliably.

The lock walls 51 are locked while sandwiched between the lock pieces 17 and the respective auxiliary walls 18. A force could act on the respective lock pieces 17 in a direction to displace the lock pieces 17 out in unlocking directions. The auxiliary walls 18 are unitary with the lock pieces 17 and also would try to move outward. However, the lock walls 51 contact the outer sides of the auxiliary walls 18 to prevent outward displacements of the auxiliary walls 18. Accordingly, the lock pieces 17 are unlikely to be deformed in the unlocking directions and the lock pieces 17 and the lock projections 52 are unlikely to be disengaged. Therefore the guiding portion 15 of the wire holder 10 is reliably held fixed to the fixable portion 50.

The standing portions 17A are structured to have high rigidity in inward and outward directions. Thus, external matter is not likely to deform the lock pieces 17 sufficiently in the unlocking directions to effect unlocking.

The auxiliary walls 18 have substantially the same height as the lock pieces 17 to ensure a sufficient depth for the insertion spaces 25. Thus, the lock walls 51 and the lock pieces 17 are unlikely to be inclined relative to each other and the locked state can be held reliably, as compared to the case where the auxiliary walls 18 have a low height.

The guide 15 is held substantially horizontal and extends forward when the fixing portion 16 is locked with the fixable portion 50. Then, the wires W are supported by the guide 15 from below and are prevented from resiliently restoring down in a direction to widen the angle of the bent parts.

The first step in detaching the wire holder 10 is to detach the fixing portion 16 from the fixable portion 50. In this case, assume the fixable portion 50 is in a recess defined by a wall K that surrounds opposite left and right sides and the upper side of the fixable portion 50, as shown in FIG. 5. Additionally, the wall K extends down at the right side in FIG. 5. Also assume that minimum spaces are defined between the lock pieces 17 and the wall K at the left and right sides to enable deformations of the lock pieces 17 when detaching the fixing portion 16 (see FIG. 6).

No area exists for the insertion of the unlocking jig D into the second opening 28 because of the presence of the wall K at the right lower side. Thus, the unlocking jig D is inserted into the first opening 23 from the left lower side as shown in FIG. 5. The leading end of the unlocking jig D is placed on the inner surface of the unlocking portion 20 and an intermediate part of the unlocking jig D is supported on the first fulcrum 22. The leading end of the unlocking jig D is guided by the first guiding surface 24 at the bottom end of the unlocking portion 20 and is inserted smoothly without getting caught by the bottom end of the unlocking plate 20.

Figure 6:
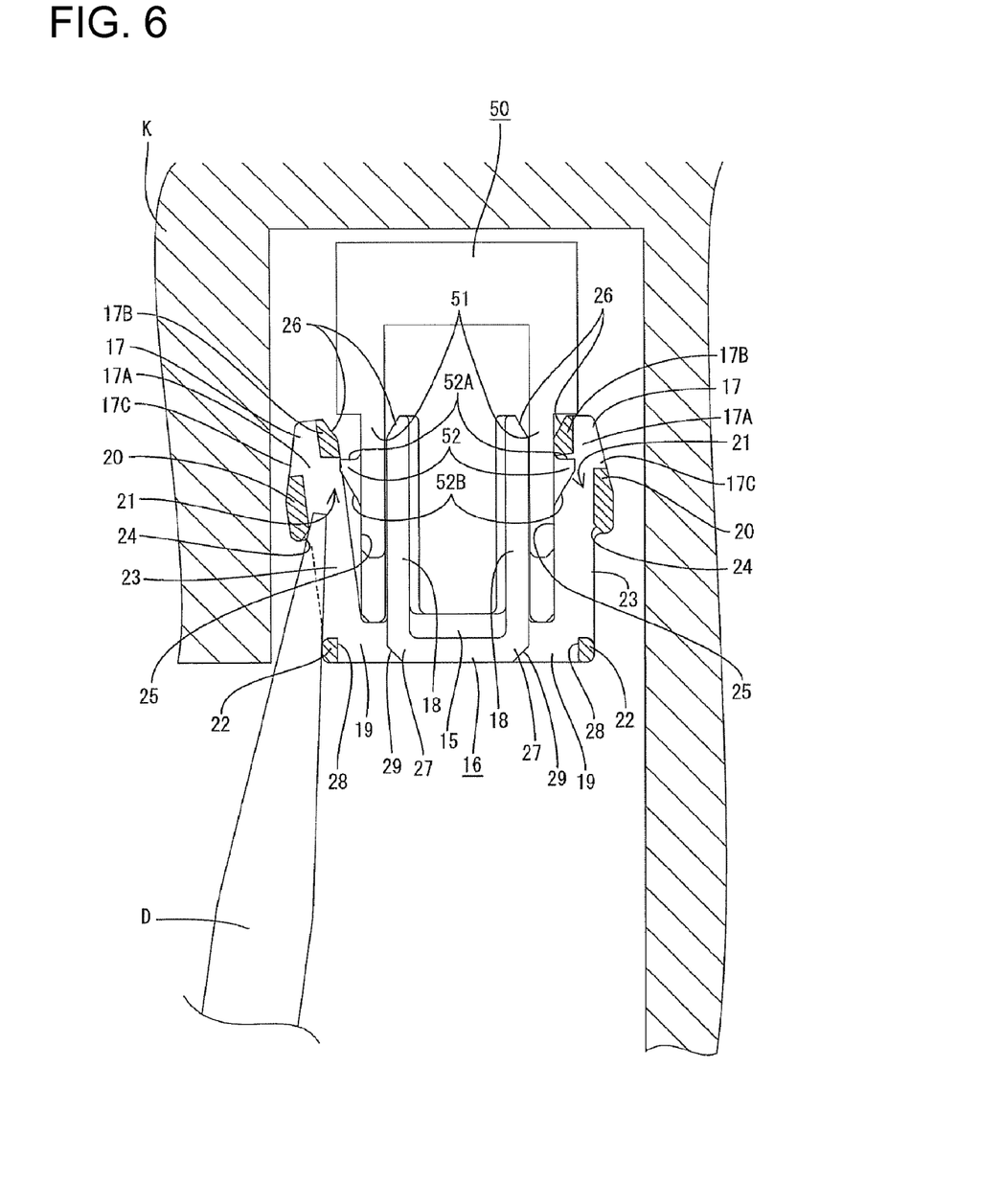
FIG. 6 is an enlarged section showing the left lock piece unlocked.

The lower end of the unlocking jig D then is displaced to the right to generate a lever action about the first fulcrum 22. Therefore, the leading end of the unlocking jig D is displaced out and to the left, as shown in FIG. 6, and causes the lock piece 17 to deform leftward in the unlocking direction. The engaging portion 17B moves leftward with the lock piece 17, and sufficient deformation of the lock piece 17 causes the engaging portion 17B to disengage from the lock surface 52A of the lock projection 52 to effect unlocking. The right surface of the unlocking portion 20 (where the leading end of the unlocking jig D is placed) is aligned in the transverse direction with the left surface of the first fulcrum 22 (surface supporting the bottom end of the unlocking jig D) in the locked state. Thus, the unlocking jig D is aligned so that the lower end is slightly to the left of a vertical alignment. Accordingly, the unlocking operation can be carried out despite the extension of the wall K to the right lower side.

A relatively large force acts on the first fulcrum 22 during unlocking due to the high rigidity of the base end of the lock piece 17. However, the first fulcrum 22 can endure such a large force since the opposite ends of the first fulcrum 22 are supported on the standing portions 17A and the force acting on the first fulcrum 22 is received by the both standing portions 17A.

Figure 7:
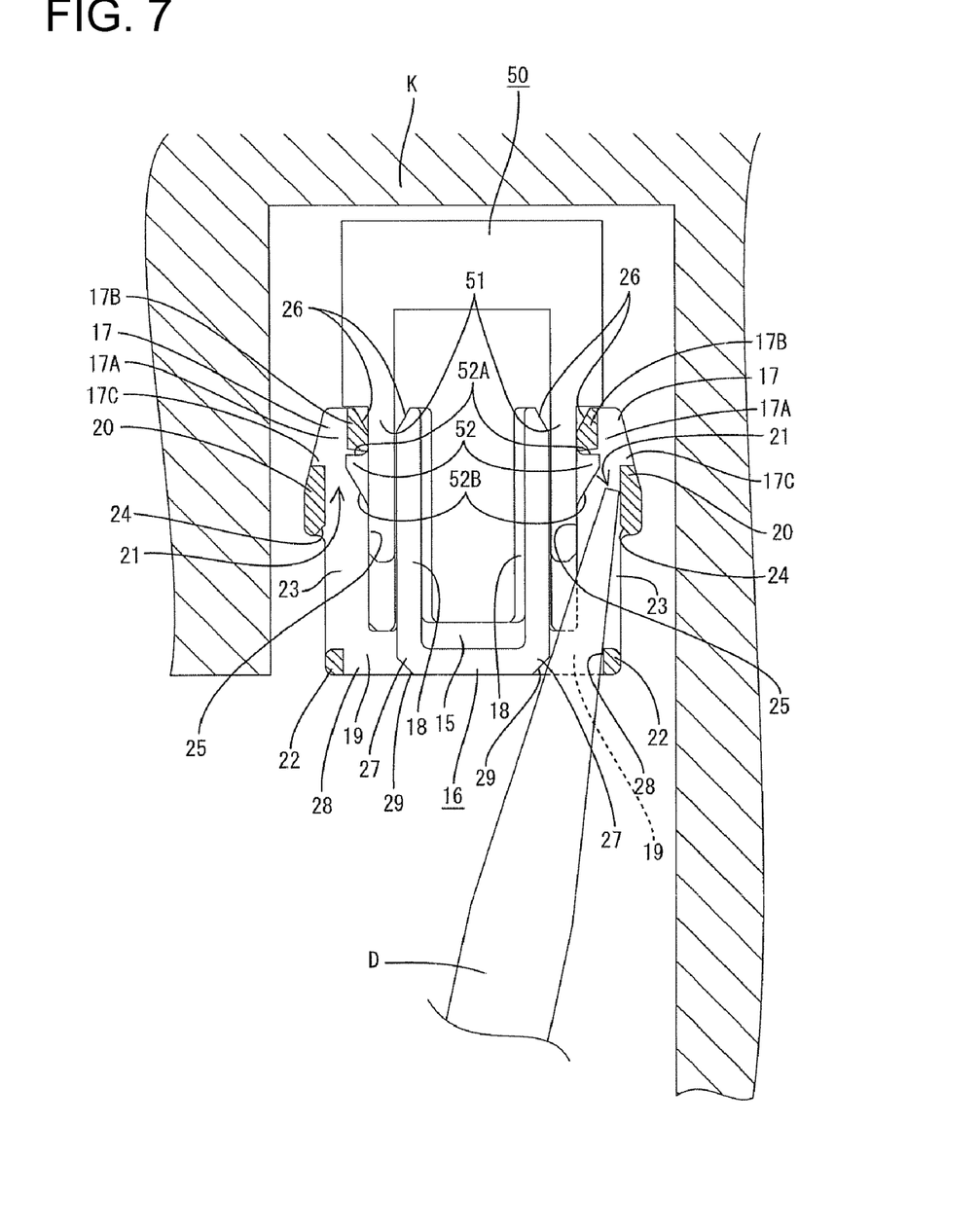
FIG. 7 is an enlarged section showing a state where the jig is inserted through a second opening of a right lock piece.

The presence of the wall K prevents the unlocking jig D from being inserted into the first opening 23 for unlocking of the right lock piece 17. Therefore, the unlocking jig D is inserted into the second opening 28 from the left lower side, as shown in FIG. 7. More particularly, the leading end of the unlocking jig D is placed on the inner surface of the unlocking plate 20 and a lower part of the unlocking jig D is supported on the second fulcrum 27. The leading end of the unlocking jig D is guided by the second guiding surface 29 at the bottom end of the auxiliary wall 18 and is inserted smoothly without getting caught by the bottom end of the auxiliary wall 18.

Figure 8:
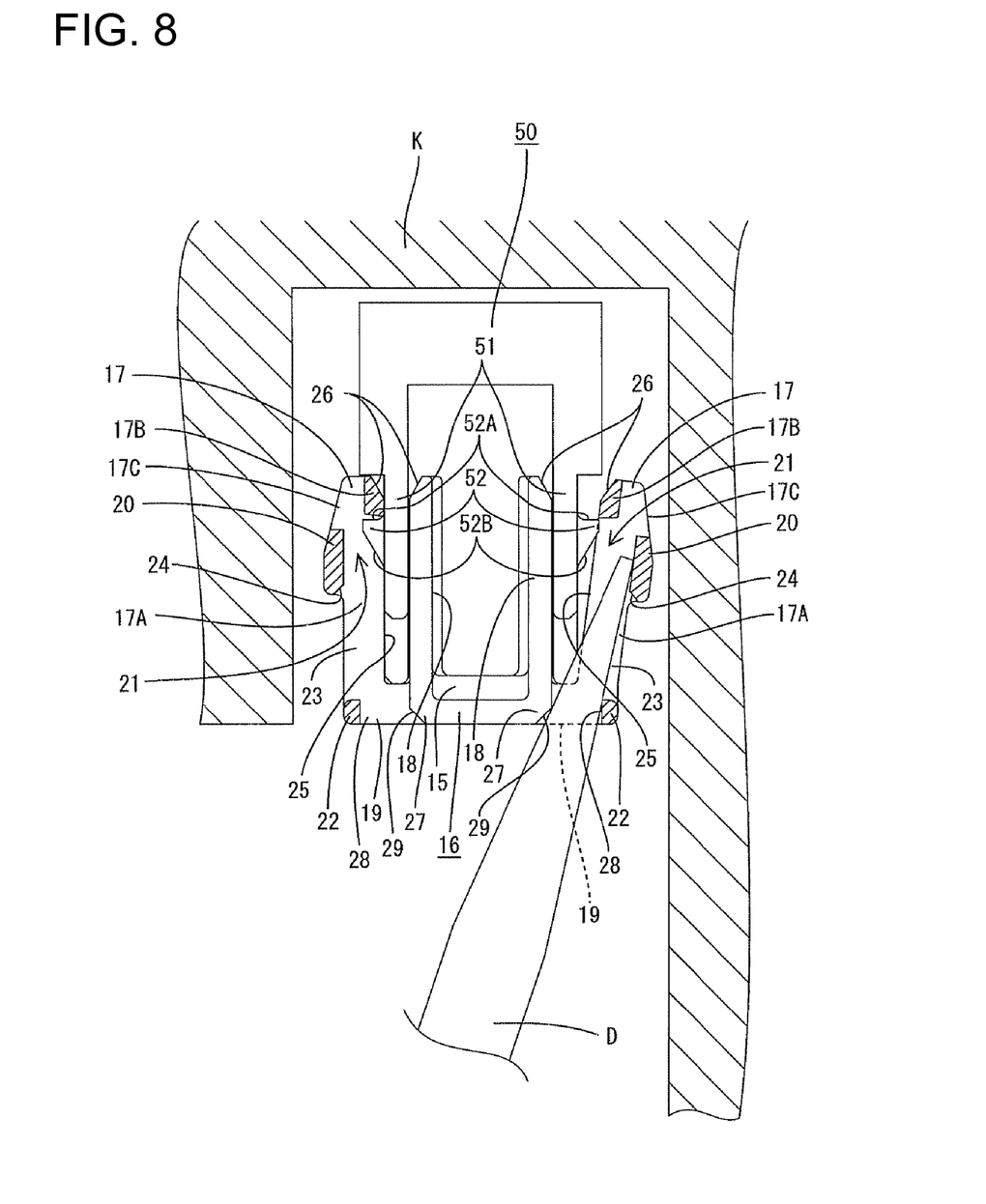
FIG. 8 is a partial enlarged section showing a state where the right lock piece is unlocked.

The lower side of the unlocking jig D then is displaced out and to the left to generate a lever action about the second fulcrum 27. Thus, the leading end of the unlocking jig D is displaced in and to the right, as shown in FIG. 8. The leading end of the unlocking jig D pushes the unlocking plate 20 inwardly to the right with a corresponding rightward deformation of the lock piece 17 in the unlocking direction. Sufficient deformation of the lock piece 17 displaces the engaging portion 17B to the right of the lock projection 52 and disengages the engaging portion 17B from the lock surface 52A to effect unlocking. The lower end of the unlocking jig D is inclined to the left in the unlocked state. Accordingly, both the left and right lock pieces 17 can be unlocked.

Unlocking also can be effected if the left wall extends down and there is no insertion area for the unlocking jig D at the left lower side of the fixing portion 16. In this case, the unlocking jig D cannot be inserted through the first opening 23 to unlock the left lock piece 17, but unlocking can be effected by inserting the unlocking jig D through the second opening 28. Similarly, the unlocking jig D cannot be inserted through the second opening 28 to unlock the right lock piece 17, but unlocking can be effected by inserting the unlocking jig D through the first opening 23. The left inner surface of the unlocking plate 20 and the right surface of the first fulcrum 22 substantially align in the transverse direction. Thus, the lower end of the unlocking jig D is inclined slightly to the right of vertical and unlocking can be effected even if there is no area for inclining the unlocking jig D at the left lower side.

As described above, the prior art had only one fulcrum for a lever action for each lock piece, and the insertion area of the unlocking jig D was limited to one spot for each lock piece. In other words, if there were both left and right lock pieces, one insertion area for the unlocking jig D had to be provided for each lock piece, i.e. a total of two insertion areas (both left and right lower sides) had to be provided. This prior art locking construction could not be adopted in the case where insertion areas could not be provided at the opposite sides because of the presence of a wall at one of the left and right lower sides of the fixing portion 16 as described above.

However, the invention merely requires an insertion area for the unlocking jig D to be present either at the lower left side or the lower right side of the fixing portion 16. Accordingly, restrictions on the areas necessary for the unlocking operation are alleviated more than before. Thus, restriction in terms of the arrangement of parts can be alleviated by being able to cope with the extension of a wall at either side of the fixing portion 16.

Further, substantially vertically open passages 21 are defined between the unlocking plates 20 and the engaging portions 17B and the unlocking jig D can be inserted from above to push the unlocking plate 20. Thus, the insertion area for the unlocking operation may be provided only at the upper side of the fixing portion 16. Specifically, contrary to the previous examples, unlocking can be effected even if the lower three sides of the fixing portion 16 are surrounded by the wall K. At this time, unlocking can also be effected by inserting the unlocking jig D between the leading end of the lock piece 17 and the lock wall 51.

The area on the inner surface of each unlocking plate 20 is larger than the leading end of the unlocking jig D. Thus, the insertion depth of the unlocking jig D can be permitted to vary regardless of which of the left and right lock pieces 17 is to be unlocked. Therefore the unlocking jig D can easily push the lock pieces 17.

The lock pieces would be large if the unlocking portions and the engaging portions were arranged at substantially the same vertical heights in view of the need to define insertion passages for the unlocking jig D between engaging portions and unlocking portions. On the other hand, the lock pieces would be difficult to displace in the unlocking directions if the unlocking portions were too close to the base ends of the lock pieces. However, the unlocking plates 20 of the invention are right below the engaging portions 17. Thus, the lock pieces 17 can be miniaturized and can be operated easily during unlocking.

The wire holder 10 can be detached by detaching the mounting portions 11 from the housing 41 after the fixing portion 16 is detached from the fixable portion 50, as described above.

As described above, the unlocking jig D can be inserted through the first opening 23 so that the leading end of the unlocking jig D is placed on the unlocking portion 20 and so that the intermediate part of the unlocking jig D is placed on the first fulcrum 22. A lever action then is generated to deform the lock piece 17 in the unlocking direction and out of engagement with the lock projection 52. The unlocking jig D similarly can be inserted through the second opening 27 to place the leading end of the unlocking jig D on the unlocking portion 20 and to place the intermediate part of the unlocking jig D on the second fulcrum 27, which is at a position different from the first fulcrum 22. A lever action then is generated to deform the lock piece 17 in the unlocking direction. The insertion area for the unlocking jig D differs depending on whether unlocking is effected using the first fulcrum 22 or the second fulcrum 27. Thus, unlocking can be effected by inserting the unlocking jig D into the selected one of the different insertion areas, and restrictions on the insertion area for the unlocking jig D can be alleviated more as compared to the case where the insertion area is limited to one spot.

It is sufficient to ensure only one of the two different insertion areas. Thus, a degree of freedom in designing for the arrangement of parts can be improved and restriction in terms of the arrangement of parts can be alleviated. Therefore, restriction on the insertion areas for the unlocking jig D necessary for the unlocking operation can be alleviated, which consequently leads to the alleviation of restriction in the arrangement of parts.

The invention is not limited to the above described and illustrated embodiment. For example, the following embodiments are also embraced by the technical scope of the present invention as defined by the claims.

Each lock piece 17 includes the pair of standing portions 17A standing up from the projecting ends of the corresponding pair of connecting portions 19 in the foregoing embodiment. However, the invention is not limited thereto, and the lock piece may include one cantilevered standing portion.

Vertically open passages 21 are defined between the corresponding unlocking portions 20 and engaging portions 17B so that the unlocking jig D can be inserted from both above and below to push the unlocking portion in the foregoing embodiment. However, the invention is not limited thereto. For example, even if the upper ends of the unlocking portions are connected with the upper ends of the corresponding engaging portions and the unlocking jig is at least partly insertable only from below, restriction on the insertion area for the unlocking jig can be alleviated more than before.

The bottom ends of the auxiliary walls 18 serve as the second fulcrums 27 in the foregoing embodiment. However, the invention is not limited thereto. For example, the second fulcrums may be provided separately from the auxiliary walls.

The present invention is applied in the case where left and right lock pieces 17 are provided in the foregoing embodiment. However, only one lock piece may be provided for each fixing portion.

The auxiliary walls 18 are provided for the respective lock pieces 17 in the foregoing embodiment. However, auxiliary walls 18 may not be necessarily provided if it is not necessary to give a large lock holding force or other means may be provided to increase the lock holding force.

What is claimed is:

1. A locking construction for locking a first member and a second member in an attached state, comprising:
    at least one lock piece cantilevered on the first member and having a base end and a free end, the free end being resiliently deformable upon attaching the first member and the second member together and resiliently restorable to engage at least one lock on the second member when the two members reach a properly attached state;
    at least one unlocking portion on the lock piece at a position spaced from the base end;
    a first fulcrum provided on the lock piece closer to the base end than the unlocking portion; and
    a second fulcrum provided on the first member at a position spaced from both the first fulcrum and the unlocking portion, whereby a leading end of an unlocking jig can be placed on the unlocking portion (20) while an intermediate portion of an unlocking jig is placed on a selected one of the first and second fulcrums to generate a lever action for resiliently deforming the lock piece in an unlocking direction.

2. The locking construction of claim 1, wherein the at least one lock comprises two locks provided respectively on two opposed lock walls of the second member.

3. The locking construction of claim 2, wherein the at least one lock piece comprises two lock pieces engageable respectively with the lock walls from corresponding outer sides.

4. The locking construction of claim 3, wherein the respective lock pieces are provided unitarily with auxiliary walls that are insertable at inner sides of the lock walls and capable of sandwiching the lock walls between the lock pieces and the auxiliary walls.

5. The locking construction of claim 4, wherein a first guiding surface is formed at an inner side of one part of the unlocking portion and is inclined in a direction for guiding insertion of the unlocking jig.

6. The locking construction of claim 5, wherein a second guiding surface is formed at an outer side of one part of each auxiliary wall or at the second fulcrum and is inclined in direction for guiding insertion of the unlocking jig.

7. The locking construction of claim 1, wherein the unlocking portion is exposed at the free end of the lock piece.

8. The locking construction of claim 1, wherein the lock piece has two standing portions projecting from at least one connecting portion and an engaging portion connecting ends of the standing portions spaced from the connecting portion.

9. The locking construction of claim 1, wherein the first member is a guide of a wire holder for holding wires bent to extend in a specified direction and wherein the second member is a fixable portion of a connector housing.

10. A wire holder for holding and guiding wires relative to a fixable portion of a connector housing, the wire holder comprising:
   an elongated guide having at least one side edge;
   at least one pair of connecting portions extending the side edge of the guide;
   a standing portion projecting from each of the connecting portions to define at least one pair of the standing portions spaced from the guide;
   at least one unlocking portion extending between the standing portions in each of the pairs of standing portions, the unlocking portion being spaced from the connecting portions;
   at least one first fulcrum extending between the standing portions in the pair of standing portions at positions substantially adjacent the connecting portions; and
   at least one second fulcrum extending between the connecting portions in the pair of connecting portions at positions substantially adjacent the guide.

11. The wire holder of claim 10, wherein the guide has two side edges, the at least one pair of connecting portions comprising two pairs of connecting portions extending respectively from the side edges of the guide, and the at least one pair of standing portions comprising two pairs of standing portions projecting respectively from the pairs of connecting portions, the at least one unlocking portion comprising two unlocking portions extending respectively between the standing portions in each of the pairs standing portions.

12. The wire holder of claim 11, wherein the at least one first fulcrum comprises two first fulcrums extending between the standing portions in each of the pairs of standing portions at positions substantially adjacent the connecting portions, and the at least one second fulcrum comprises two second fulcrums extending between the connecting portions in each of the pairs of connecting portions at positions substantially adjacent the guide.

13. The wire holder of claim 12, further comprising first and second auxiliary walls projecting from the guide so that the first auxiliary is opposed to the first pair of standing portions and so that the second auxiliary wall is opposed to the second pair of standing portions.

14. The wire holder of claim 12, wherein each of the unlocking portions has an inwardly facing surface and each of the first fulcrums has an outwardly facing surface, the inwardly facing surface of each of the unlocking portions being substantially coplanar with the outwardly facing surface of the respective first fulcrum.

15. The wire holder of claim 10, further comprising at least one engaging portion extending between the standing portions in the pair of standing portions and disposed so that the unlocking portion is between the engaging portion and the pair of connecting portions.

* * * * *